Sept. 10, 1929.    C. W. MARSH    1,727,552
ELECTRIC CELL
Original Filed Nov. 6, 1919    2 Sheets-Sheet 2
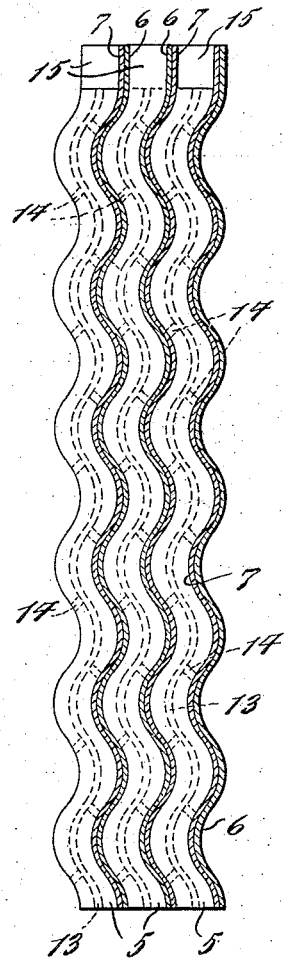
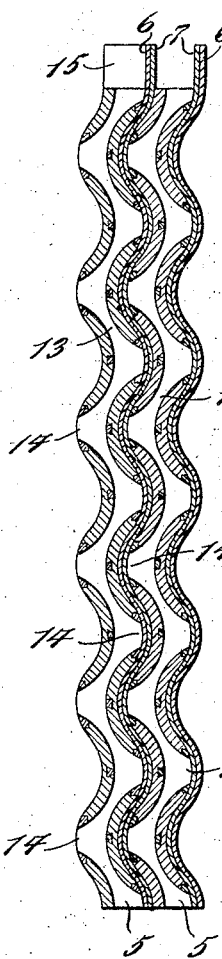
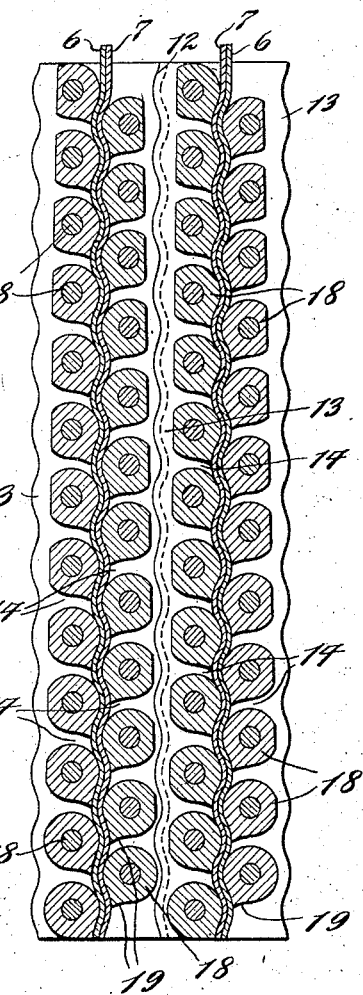

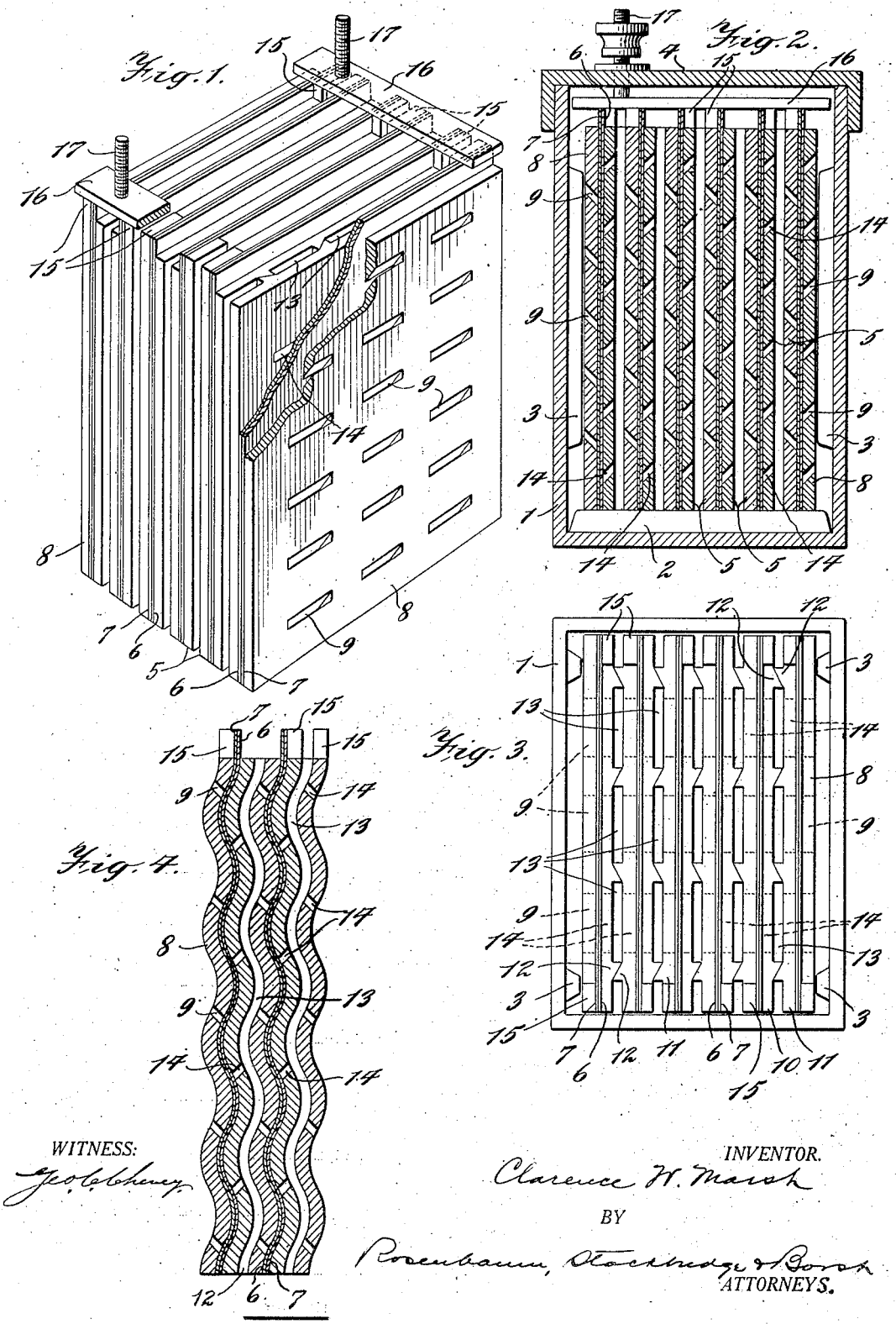

Patented Sept. 10, 1929.

1,727,552

UNITED STATES PATENT OFFICE.

CLARENCE W. MARSH, OF GREENWICH, CONNECTICUT.

ELECTRIC CELL.

Application filed November 6, 1919, Serial No. 335,982. Renewed August 31, 1923.

This invention relates to electric cells, and is broadly applicable to electrolytic cells in which it is desirable to keep the gases separate by diaphragms as in hydrogen and oxygen electrolytic cells, and to cells in which liquid products are to be collected and kept separate as well as to primary and secondary batteries. In such cells gases are liberated when current is passing therethrough, and these gases tend to collect on the electrodes and not only do they materially increase the resistance of the cell but they tend to prevent a local circulation of the electrolyte and the bringing of a fresh portion thereof into contact with the electrodes, and thus by the accumulated gases, portions of the electrodes are rendered inactive. In storage batteries, it is desirable that the electrodes or plates be relatively high, so as to decrease the amount of floor space, occupied by the cells of a given capacity. Heretofore the height of the plates has been limited due to the fact that the gases accumulated on the upper portions thereof when charging, and because of the increased resistance in this portion of the cell and the failure of the electrolyte to contact with the entire surface of the plates, the effective capacity has been very materially decreased, and the plates also have a tendency to buckle or become warped.

An object of my invention is to provide means for decreasing the internal resistance of cells such as storage batteries and increasing the current capacities.

Another object is to provide means for the removal of gases from the active faces of the electrodes having broad substantially unbroken surfaces without materially decreasing the effective area thereof.

Another object is to provide for a better local circulation of the electrolyte in such cells and to increase the effective area of the plates or electrodes.

Another object is to impart greater rigidity and strength to the plates and prevent warping of or relative movement between the plates.

Further objects of the invention will be apparent from the detailed description hereinafter to follow when taken in connection with the accompanying drawings.

In carrying out my invention I provide the intermediate electrodes with vertically extending channels which are connected to numerous points in the outer faces of the electrodes by means of branch passages which preferably are inclined upwardly toward the vertically extending channels. The vertically extending channels may conveniently be formed by constructing each electrode of two plates which are spaced apart by a plurality of ribs which have complementary interlocking faces to prevent lateral shifting of one plate with respect to the other. The surface of each plate may consist of a plurality of rods or elements in which case the spaces between the rods or elements constitute the branch passages, or the plates may have a substantially continuous surface except for the apertures which form the branch passages. When the surfaces are formed of rods or elements, the inner faces of the rods may be flattened progressively greater toward the top, in order to enlarge the interior channel at the upper portion where more gas is to be carried off, without increasing the space between the plates or materially decreasing the effective surface of the rods. The end electrodes each comprise a single plate having a plurality of apertures therethrough preferably inclined upwardly and outwardly. Buckling and warping of the plates or electrodes has been a troublesome factor in many prior batteries and while it is believed that the removal of liberated gases according to my invention will prevent such buckling or warping I may provide parallel alternate ridges and furrows in the electrodes which nest within one another and give strength and rigidity to the electrodes and thus prevent buckling or warping if any stresses tending to cause such conditions should for any reason be set up. Such interlocking of the electrodes also prevents relative movement between them and thus such a construction is especially valuable in portable batteries such as those used on automobiles and the like which receive considerable shaking. At the same time the effective area is increased without increasing the height of the cell. When the plates comprising spaced rods are used, the rods of each plate may be staggered with relation to the rods of the adjacent plates, so that the rods of each vertical row nest within the spaces between the rods of the adjacent row, and thus the interlocking feature is provided for plates which are built up of elements. To prevent the possibility of gas becoming trapped between the under side of a rod and the spacer or insulator, I preferably shape the under side of the rod outwardly and downwardly to form with the upper surface of the next lower rod, an inwardly ascending branch passage.

In the drawings there are disclosed several types of cells, each of which shows a structure constituting one embodiment of the invention, but it is intended that the invention be not limited to the specific embodiments shown, but only by the scope of the claims appended hereto.

Fig. 1 is a perspective of a storage battery unit according to one form which my invention may take, without its casing, and having a portion broken away to better show other parts;

Fig. 2 is a vertical cross section of a storage battery casing and unit of the form shown in Fig. 1;

Fig. 3 is a top view of the same with the cover and connecting strips removed;

Fig. 4 is a vertical cross section of a battery similar to Figs. 1 and 2 but in which the plates, insulators and separators have parallel ridges and furrows therein to provide as interlock between them.

Fig. 5 is a vertical section of another modification of my battery;

Fig. 6 is a vertical section of another modification of my battery;

Fig. 7 is a vertical section of still another modification of my battery.

The cell comprises a casing or tank 1 having the usual bottom ribs 2, side ribs 3, a cover 4 for the tank, and a unit to be disposed in the tank. The unit comprises a plurality of electrodes 5 arranged alternately according to their polarity and having the usual insulators 6 and separators 7 between them.

Referring particularly to the embodiment illustrated in Figs. 1 to 3, the end or outside electrodes 8 are of negative polarity and comprise single plates of any suitable construction but have apertures 9 connecting numerous points in the inner faces with the outer faces and preferably inclined upwardly and outwardly. Each intermediate electrode comprises a pair of plates 10 and 11. The two plates have correspondingly disposed vertical ribs 12 on their adjacent faces for spacing the plates apart and forming between the ribs a plurality of vertically extending channels 13. The ribs have their abutting faces of a complementary shape to interact with one another and prevent lateral shifting of one plate with respect to the other. The vertical channels 13 are connected with numerous points in the outer faces of the plates by means of apertures 14 which are preferably inclined upwardly toward the vertical channels 13. The gases which are liberated in the cell tend to collect on the plates, and since the plates fit closely against the separators and insulators, the gases cannot freely pass to the top and away from the plates, and consequently the presence of the gases on the plates prevents fresh electrolyte from coming in contact with the plates and thus renders the gas covered portions of the plates inactive. The presence of the gas also increases the resistance of the cell so that current will not pass uniformly through all parts of the cell. In my construction the gases which are liberated in the cell pass through the apertures 14 into the vertical channels 13 or through apertures 9 in the end electrodes 8 where they have an unobstructed path to the exterior of the electrolyte. The interiors of the vertical and branch channels are in contact with the electrolyte and are also electrically active since the current can pass thereto from the adjacent electrode of opposite polarity by means of the apertures 14. It has been found that the extra distance through the apertures 14 adds no appreciable resistance to the passage of current. The passage of the gas through the apertures and upwardly through the channels 13, draws fresh electrolyte up with it, so that the passing of the gas to the exterior of the electrolyte not only prevents accumulations of gas which would increase the resistance of the cell, and the inactivity of the plates, but it induces local circulations of the electrolyte to continually bring fresh electrolyte into contact with the plates and thus very materially increase the efficiency of the cell. The plates of each electrode have the usual extensions 15 adjacent an end whereby those of equal polarity can be connected to strips 16 carrying or connected to terminal posts 17.

In Fig. 4, I have illustrated a slightly modified form of plate, in which the plates of the electrodes as well as the insulators and separators have parallel ridges and furrows, preferably running horizontally thereof, whereby the effective area of each plate is increased without a change in the height of the cell, and the plates due to the nesting of the ridges and furrows of one within those of the adjacent plate are interlocked against relative movement transversely to the ridges. The ridges and furrows give added strength to the plates and prevent buckling and warping which in prior constructions have been troublesome factors. The accumulations of gas on the electrodes keeps the electrolyte away and the plates will not charge and discharge uniformly over their entire surface, so that one part may be over-discharged before the remainder is sufficiently discharged. Too great a discharge results in the uneven and excessive formation of lead sulphate ($PbSO_4$) on the plates. The collection of this sulphate in the active material causes it to expand and contract and as lead has very little elasticity, mechanical strains are produced in the plates causing them to bend and warp. By removing the gas according to applicant's invention, the plates can be more evenly charged over their entire surface and thus the danger of over discharging one portion of the plate before the other is diminished, and the nesting of the ridges and furrows of one plate within those of the other gives rigidity and strength to the plates to resist any such strains, if they should occur. The apertures 14, in this modification, are preferably placed so as to lead from the under side of a ridge and provide an ascending passage leading to the interior channels 13 formed by the plate ribs 12.

In Fig. 5, I have illustrated another modification in which the two plates of each of the electrodes are integral, but have the interior channels 13 and apertures 14 formed therein. In this modification, the electrodes, separators, and insulators are shown as also having the ridges and furrows to provide for the increased area and the interlocking action, but obviously the plates could be straight as in the embodiment illustrated in Figs. 1 to 3, if desired.

In Fig. 6 I have illustrated a further modification in which the plates are formed with arcuate portions to form the ridges and furrows nesting within one another and providing for the interior channels between them. The arcuate portions may be formed, or as shown be constructed with a pasted grid.

In Fig. 7 I have illustrated another embodiment of my invention, in which the parallel ridges and furrows are formed by constructing the faces of the plates from spaced rods 18, the rods of each plate being staggered in relation to the adjacent plate. When these rods are disposed to extend horizontally and are arranged in vertical rows, the spaces between them provide for the apertures 14 and the spaces between the vertical rows form the interior channels 13. The rear sides of the rods 18 may be slightly flattened and preferably progressively toward the top, to provide for larger interior channels especially at the top where a larger amount of gas is to be removed without varying the distance between the rows or materially decreasing the effective area of the rods. The lower surface portion of each rod is preferably although not essentially curved outwardly and downwardly as at 19, to provide in co-operation with the upper surface of the next lower rod an ascending passage 14 leading from the exterior faces of the rods to the interior vertical channels 13, thereby avoiding the possibility of any of the liberated gases becoming trapped between the separators or insulators and the under side of the rods.

The plates may all be formed, or they may consist of pasted grids or be of any other suitable construction without departing from the spirit of the invention.

Separators, insulators and diaphragms have been found to be very desirable in various combinations or arrangements in electric cells, and it is to be observed that in the constructions according to my invention fewer insulators, separators, or diaphragms are necessary than are now commonly used in the same size cell, thereby effecting a saving in the space occupied by them, and in their cost.

By preventing the accumulation of the liberated gases on the upper portions of the electrodes and the consequent interference with their normal functions, the cells according to my invention can be made very high to increase their capacity, or to cut down the floor space necessary for an installation of any stated capacity.

I claim:

1. In electric cells, the combination of a plurality of plates, arranged in pairs of equal polarity with an ascending passage between the plates of each pair, each plate having openings therethrough and inclined upwardly toward the passage between the pair, and an electrolyte in which said plates are immersed.

2. In electric cells, the combination of a plurality of plates arranged in pairs of equal polarity with an ascending passage between the plates of each pair, each plate having openings therethrough at numerous points in its face and inclined upwardly toward the passage between the pair, and an electrolyte in which said plates are immersed.

3. In electric cells, the combination of a plurality of electrodes having similar ridges and furrows therein, the ridges of each electrode resting within the furrows of an adjacent electrode, said electrodes comprising plates arranged in pairs of equal polarity with an ascending passage between each pair, each pair being arranged alternately with a pair of opposite polarity, each electrode having channels connecting numerous places in the active faces thereof with the ascending passage between the plates.

4. In electric cells, the combination of a plurality of electrodes having similar ridges and furrows therein, the ridges of each electrode resting within the furrows of an adjacent electrode, said electrodes comprising plates arranged in pairs of equal polarity with an ascending passage between each pair, each pair being arranged alternately with a pair of opposite polarity, each electrode having channels connecting numerous places in active faces thereof with the ascending passage between the plate, said channels opening from the active face of an electrode on the under side of a ridge.

5. In electric cells, the combination of an electrolyte a plurality of electrodes immersed therein and arranged alternately according to their polarity each electrode having horizontal ridges and furrows therein, the ridges of each electrode being disposed within the furrows of the adjacent electrodes and each electrode having means for the removal of liberated gases from numerous points of the active surfaces thereof.

6. In electric cells, the combination of an electrolyte, a plurality of electrodes immersed therein and arranged alternately according to their polarity, each electrode having horizontal ridges and furrows therein, ridges of each electrode being disposed within the furrows of the adjacent electrodes and each electrode having means for the removal of liberated gases from points on the underside of each ridge to the exterior of the electrolyte.

7. In electric cells, the combination of an electrolyte, a plurality of electrodes immersed therein and arranged alternately according to their polarity, each electrode having horizontal ridges and furrows in its active faces, the ridges of each electrode resting within the furrows of the adjacent electrode, each electrode having channels therein for the removal of liberated gases from the active surfaces thereof, the channels leading from the active faces on the under sides of each ridge.

8. In electric cells, the combination of a plurality of plates arranged in pairs of equal polarity with an ascending passage between the plates of each pair, each plate having openings connecting numerous points in its face with the ascending passage between them.

9. In electric cells, the combination of end plates and intermediate plates, the intermediate plates being arranged in pairs, each pair to form an electrode and each end plate acting as an electrode, the plates forming each pair having ascending passages therebetween and also having openings leading thereto from numerous points in the outside faces, each end plate having openings therethrough for the passage of liberated gas to the outside face thereof, and an electrolyte in which said electrodes are immersed.

10. In electric cells, an electrode comprising two vertical rows of horizontally disposed rods forming an internal channel between them, the rods of one row being staggered vertically with respect to the other row, and the inner adjacent faces of the rods being flattened to enlarge the channel therebetween.

11. An electric cell, comprising a plurality of electrodes, each electrode comprising two vertical rows of horizontally disposed rods forming an internal channel therebetween, the rods of one row being staggered vertically with respect to the other row, the rods of each electrode being nested in the spaces between the rods of the adjoining electrodes, the rods in each row being spaced vertically to form passages leading from numerous points in the vertical face of the electrode to the channel therein, and an electrolyte in which said electrodes are immersed.

12. An electric cell, comprising a plurality of electrodes, each electrode formed of two vertical rows of horizontally disposed rods forming an internal channel between them, the rods of each row being staggered in relation to the other row, the lower surface portion of each rod being curved outwardly and downwardly to provide in co-operation with the upper surface of the next lower rod an ascending passage leading to the internal channel, the rods of each electrode being nested in the spaces between the rods of the adjoining electrode, and an electrolyte in which said electrodes are immersed.

13. In electric cells, an electrode, comprising two vertical rows of horizontally disposed rods forming an internal channel between them, and the inner adjacent faces of the rods being flattened to enlarge the channel without increasing the distance between the rows.

14. In electric cells, an electrode, comprising two vertical rows of horizontally disposed rods forming an internal channel between them, and the inner adjacent faces of the rods being flattened in amounts progressively greater toward the top to enlarge the channel without increasing the distance between the rows.

In witness whereof, I hereunto subscribe my signature.

CLARENCE W. MARSH.